S. B. BACHELLER.

Fly-Traps.

No. 134,833. Patented Jan. 14, 1873.

Witnesses.
Edmund Masson
John R. Young

Inventor.
Samuel B. Bacheller,
by Prindle & Roy his
Attys.

UNITED STATES PATENT OFFICE.

SAMUEL B. BACHELLER, OF McDONOUGH, NEW YORK.

IMPROVEMENT IN FLY-TRAPS.

Specification forming part of Letters Patent No. 134,833, dated January 14, 1873.

*To all whom it may concern:*

Be it known that I, SAMUEL B. BACHELLER, of McDonough, in the county of Chenango and in the State of New York, have invented certain new and useful Improvements in Fly-Traps; and do hereby declare that the following is a full, clear, and exact description thereof, reference being had to the accompanying drawing making a part of this specification, in which—

Figure 1:
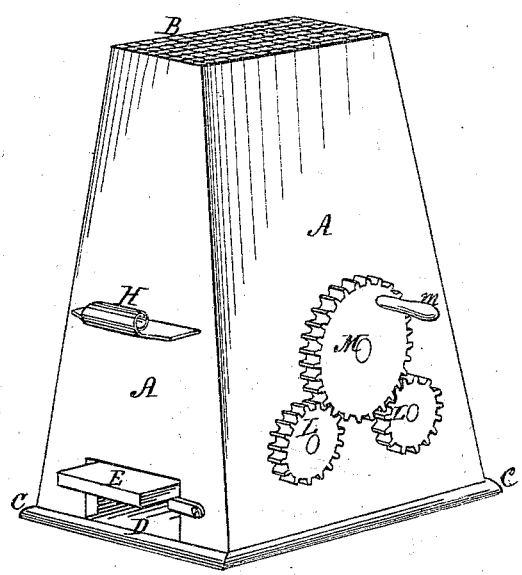
Figure 2:
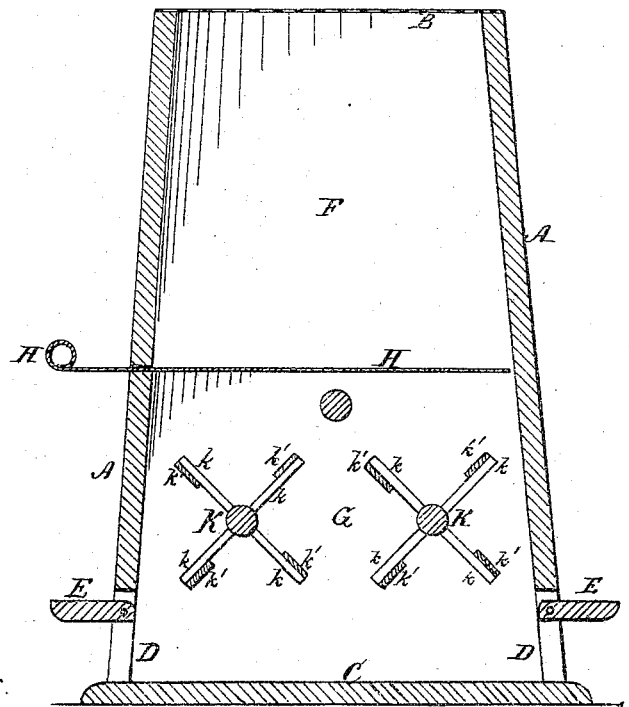

Figure 1 is a perspective view of my device, and Fig. 2 is a vertical central section of the same.

Letters of like name and kind refer to like parts in each of the figures.

My invention is designed for use in trapping flies and other like insects; and it consists in the peculiar construction and combination of parts, substantially as and for the purpose hereinafter specified.

In the annexed drawing, A represents the casing of the device, constructed preferably with a rectangular form in cross-section, and an inward and upward inclination of its sides so as to cause its lower end to have a much larger area than its upper end. The upper end of the casing is inclosed by means of wire-gauze B, while its lower end rests upon and is secured to a base-plate, C, which prevents all access to the same from below. Within opposite sides of the casing are provided two openings, D, which are inclosed, when desired, by two doors, E, that are hinged or otherwise pivoted at their upper edges to or upon the contiguous portion of said casing, so as to close by the force of gravity when not purposely prevented. Vertically the interior of the casing is divided into two compartments, F and G, by means of a slide, H, which passes inward through a suitable opening formed in one wall of said casing, and may be withdrawn or replaced at will. Within the lower compartment G are pivoted two shafts, K, which are provided with suitable radial arms $k$, and the latter connected together in pairs by means of slats $k'$, so as to form fan or wind wheels. Upon one side of the casing the shafts K extend outward, and are each provided with a pinion, L, that meshes with and receives motion from a gear-wheel, M, which is pivoted to said casing above and between said pinions. A stud or pin, $m$, extending horizontally outward from near the periphery of the gear-wheel M, completes the device, the operation of which is as follows:

The entrance-doors are raised and secured in position, a quantity of suitable bait placed within the lower compartment, and the trap set in a convenient and light place. The flies will be attracted by the bait and caused to enter the casing, when, after a suitable number have entered, the doors are closed, the slide withdrawn, and the fans revolved. The motion of the fans will disturb the flies and cause them to fly upward toward the light, when, by closing said slide, said flies will be confined within the upper compartment, and the lower one left free for use as before, said operation being repeated until the upper compartment is filled with flies, and it becomes expedient to destroy them.

The device shown is believed to possess, in a marked degree, all the requisites of convenience, efficiency, and simplicity of construction, and can be produced at a comparatively low cost.

Having thus fully set forth the nature and merits of my invention, what I claim as new is—

The hereinbefore-described device consisting of the casing A divided into compartments F and G by means of the slide H provided with the doors E, and containing the pivoted fans K, $k$, and $k'$, substantially as and for the purpose specified.

In testimony that I claim the foregoing I have hereunto set my hand this 23d day of October, 1872.

SAMUEL B. BACHELLER.

Witnesses:
 R. B. PRINDLE,
 W. MERRIFIELD.